Patented Mar. 12, 1940

2,193,774

UNITED STATES PATENT OFFICE 2,193,774

ACCELERATOR OF VULCANIZATION

Arthur W. Sloan and Paul C. Jones, Akron, Ohio, assignors to The B. F. Goodrich Company, New York, N. Y., a corporation of New York No Drawing. Application September 15, 1937, Serial No. 164,012

17 Claims. (Cl. 260—793)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability combined with their high cost resulted in a search for less active materials. Derivatives of mono-aryl and alkyl-aryl dithiocarbamic acids have been proposed as accelerators, but they are subject to the same disadvantages, and, in some cases, are even more active than the dialkyl compounds.

The process of this invention consists in vulcanizing rubber in the presence of a mixed anhydride of a diaryl dithiocarbamic acid and an organic carboxy acid. The diaryl dithiocarbamic acid portion of the mixed anhydride may be derived from diphenyl dithiocarbamic acid or the similar ditolyl (ortho, meta, para or mixed), dinaphthyl (alpha, beta or mixed), dixenyl, phenyl-naphthyl, phenyl-xenyl, phenyl-cumyl, phenyl - p - isoprophenyl - phenyl, p-allylphenyl-beta - naphthyl, phenyl - p - isopropoxyphenyl, phenyl-p-phenyloxyphenyl, phenyl-p-hydroxyphenyl, di-o-anisyl, phenyl-p-chlorphenyl, phenyl - m - bromphenyl, phenyl - p - dimethylaminophenyl, phenyl-p-methylaminophenyl, phenyl-p-anilinophenyl, phenyl-p-nitrophenyl, phenyl-p-acetylamidophenyl, or other like diaryl dithiocarbamic acids. The term aryl is therefore to be understood as designating both unsubstituted and substituted monovalent radicals containing an aromatic carbocyclic ring with the free valence on a nuclear carbon atom unless it is specifically limited to hydrocarbon aryl groups. The diarylarylene bis dithiocarbamic acids such as diphenylphenylene bis dithiocarbamic acid are also included in the generic term diaryl dithiocarbamic acid. The organic carboxy acid portion may be derived from benzoic, p-nitrobenzoic, p-chlorbenzoic, p-benzoylbenzoic, o-benzoylbenzoic, phthalic, salicylic, acetic, propionic, valeric, stearic, maleic, acetoacetic, crotonic, trichloracetic, p-toluic, phenylacetic, bromacetic, furoic, p-quinolylbenzoic, alpha-naphthoic, beta-naphthoic, or other like acids.

These mixed anhydrides are very easily prepared by reacting the free acids, amine salts, ammonium salts, metallic salts, etc., of diaryl dithiocarbamic acids with the acid halides of the organic carboxy acids. The mixed anhydride of diphenyl dithiocarbamic acid and p-nitrobenzoic acid, which may be named p-nitrobenzoic diphenyl dithiocarbamic anhydride for convenience, may be prepared by reacting sodium diphenyl dithiocarbamate with p-nitrobenzoyl chloride. Benzoic phenyl-beta-naphthyl dithiocarbamic anhydride may be prepared by reacting phenyl-beta-naphthyl dithiocarbamic acid with benzoyl chloride. The corresponding methods for preparing the other accelerators of this invention will be evident to one skilled in the art.

As a specific example of one embodiment of the method of this invention, a rubber composition is prepared by mixing rubber 100 parts by weight, zinc oxide 5 parts, stearic acid 1 part, sulfur 3.5 parts, and benzoic phenyl-p-naphthyl dithiocarbamic anhydride 0.5 part. When the composition is cured in a press for 30 minutes at 260° F., a well-vulcanized product having a tensile strength of 3780 lbs. per sq. in. and an elongation of 765% is produced. Similar results are obtained with benzoic diphenyl dithiocarbamic anhydride, p-nitrobenzoic diphenyl dithiocarbamic anhydride, or indeed any of the equivalent accelerators enumerated above.

Not only do the accelerators of this invention have little tendency to produce scorching, but compositions which have been vulcanized in the presence of these mixed anhydrides exhibit unusual resistance to deterioration by aging. The compositions suffer practically no diminution in tensile strength and elongation after 48 hours in a bomb containing oxygen at a pressure of 300 lbs. per sq. in. and at a temperature of 158° F., a treatment which often completely destroys ordinary rubber compositions. This valuable property is particularly unexpected, since strongly acidic substances in general are poor antioxidants, and the presence of carbonyl groups often increases the rate of deterioration of rubber compositions.

The term "carboxy acid" as herein employed is used to distinguish oxygen acids from the corresponding thio acids which are not included within the scope of this invention, since many of them exhibit a pronounced tendency to cause scorching of compositions in which they are used.

It is to be understood that the specific examples given above are merely illustrations of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha or synthetic rubber; that the accelerators may be incorporated in the rubber by mastication, milling, or other suitable methods; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in metal molds, in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

We claim:

1. The process which comprises vulcanizing rubber in the presence of a mixed anhydride of a diaryl dithiocarbamic acid and an organic carboxy acid.

2. The process which comprises vulcanizing rubber in the presence of a mixed anhydride of a di(hydrocarbon-aryl) dithiocarbamic acid and an organic carboxy acid.

3. The process which comprises vulcanizing rubber in the presence of a mixed anhydride of a diaryl dithiocarbamic acid and an alkyl carboxy acid.

4. The process which comprises vulcanizing rubber in the presence of a mixed anhydride of a diaryl dithiocarbamic acid and an aryl carboxy acid.

5. The process which comprises vulcanizing rubber in the presence of a mixed anhydride of a phenylaryl dithiocarbamic acid and an organic carboxy acid.

6. The process which comprises vulcanizing rubber in the presence of a mixed anhydride of diphenyl dithiocarbamic acid and an organic carboxy acid.

7. The process which comprises vulcanizing rubber in the presence of stearic diphenyl-dithiocarbamic anhydride.

8. The process which comprises vulcanizing rubber in the presence of benzoic diphenyl-dithiocarbamic anhydride.

9. The process which comprises vulcanizing rubber in the presence of benzoic phenyl-beta-naphthyl-dithiocarbamic anhydride.

10. The process which comprises heating a mixture of rubber, sulfur, and a mixed anhydride of a diaryl dithiocarbamic acid and an organic carboxy acid.

11. A rubber composition which has been vulcanized in the presence of a mixed anhydride of a di(hydrocarbon-aryl) dithiocarbamic acid and an organic carboxy acid.

12. A rubber composition which has been vulcanized in the presence of a mixed anhydride of a diaryl dithiocarbamic acid and an organic carboxy acid.

13. A rubber composition which has been vulcanized in the presence of a mixed anhydride of a diaryl dithiocarbamic acid and an aryl carboxy acid.

14. A rubber composition which has been vulcanized in the presence of a mixed anhydride of a diaryl dithiocarbamic acid and an alkyl carboxy acid.

15. A rubber composition which has been vulcanized in the presence of stearic diphenyl-dithiocarbamic anhydride.

16. A rubber composition which has been vulcanized in the presence of benzoic diphenyl-dithiocarbamic anhydride.

17. A rubber composition which has been vulcanized in the presence of benzoic phenyl-beta-naphthyl-dithiocarbamic anhydride.

ARTHUR W. SLOAN.
PAUL C. JONES.